United States Patent
Sankaran et al.

(10) Patent No.: US 11,501,043 B2
(45) Date of Patent: Nov. 15, 2022

(54) GRAPH NETWORK FLUID FLOW MODELING

(71) Applicant: XECTA INTELLIGENT PRODUCTION SERVICES, Houston, TX (US)

(72) Inventors: Sathish Sankaran, Spring, TX (US); Wenyue Sun, Houston, TX (US); Sanjay Paranji, Spring, TX (US)

(73) Assignee: Xecta Intelligent Production Services, Houston, TX (US)

( * ) Notice: Subject to any disclaimer, the term of this patent is extended or adjusted under 35 U.S.C. 154(b) by 0 days.

(21) Appl. No.: 17/396,231

(22) Filed: Aug. 6, 2021

(65) Prior Publication Data

US 2022/0147674 A1 May 12, 2022

Related U.S. Application Data

(60) Provisional application No. 63/110,521, filed on Nov. 6, 2020.

(51) Int. Cl.
*G06F 30/28* (2020.01)
*G01V 99/00* (2009.01)
*G06F 113/08* (2020.01)

(52) U.S. Cl.
CPC ............ *G06F 30/28* (2020.01); *G01V 99/005* (2013.01); *G06F 2113/08* (2020.01)

(58) Field of Classification Search
CPC .... G06F 30/28; G06F 2113/08; G01V 99/005
USPC ......................................................... 703/10
See application file for complete search history.

(56) References Cited

PUBLICATIONS

Guo, Zhenyu, Albert C. Reynolds, and Hui Zhao. "Waterflooding optimization with the INSIM-FT data-driven model." Computational Geosciences 22.3 (2018). pp. 745-761. (Year: 2018).*
Hui, Mun-Hong, et al. "A robust embedded discrete fracture modeling workflow for simulating complex processes in field-scale fractured reservoirs." SPE Reservoir Simulation Conference. OnePetro, 2019. pp. 1-28. (Year: 2019).*
Thiele, Marco R., R. P. Batycky, and D. H. Fenwick. "Streamline simulation for modern reservoir-engineering workflows." Journal of Petroleum Technology 62.01 (2010): 64-70.
Durlofsky, Louis J. "Upscaling and gridding of fine scale geological models for flow simulation." 8th International Forum on Reservoir Simulation Iles Borromees, Stresa, Italy vol. 2024. 2005.
Christie, Michael Andrew, and M. J. Blunt. "Tenth SPE comparative solution project: A comparison of upscaling techniques." SPE Reservoir Evaluation & Engineering 4.04 (2001): 308-317.
Tchelepi, Hamdi A., et al. "Adaptive multiscale finite-volume framework for reservoir simulation." SPE Journal 12.02 (2007): 188-195.

(Continued)

*Primary Examiner* — John E Johansen
(74) *Attorney, Agent, or Firm* — Baker Botts L.L.P.

(57) ABSTRACT

Fluid flow dynamics modeling methods and system are provided. In some embodiments, such methods include providing an initial fluid system model including a plurality of nodes, each node characterized by one or more node fluid system parameters; and a plurality of edges between two of the plurality of nodes, each edge characterized by one or more edge fluid system parameters; and using the initial fluid system model, determining an updated fluid system model using a history-matching process.

16 Claims, 8 Drawing Sheets

(56) References Cited

PUBLICATIONS

Yousef, Ali A., et al. "A capacitance model to infer interwell connectivity from production and injection rate fluctuations." SPE Reservoir Evaluation & Engineering 9.06 (2006): 630-646.

Zhang, Yanbin, et al. "From streamlines to Fast Marching: Rapid simulation and performance assessment of shale-gas reservoirs by use of diffusive time of flight as a spatial coordinate." SPE Journal 21.05 (2016): 1883-1898.

Lerlertpakdee, Pongsathorn, Behnam Jafarpour, and Eduardo Gildin. "Efficient production optimization with flow-network models." SPE Journal 19.06 (2014): 1083-1095.

Zhao, Hui, et al. "INSIM: A data-driven model for history matching and prediction for waterflooding monitoring and management with a field application." SPE reservoir simulation symposium. OnePetro, 2015.

Fujita, Yusuke, Akhil Datta-Gupta, and Michael J. King. "A comprehensive reservoir simulator for unconventional reservoirs that is based on the Fast Marching method and diffusive time of flight." SPE Journal 21.06 (2016): 2276-2288.

Iino, Atsushi, et al. "Efficient modeling and history matching of shale oil reservoirs using the fast marching method: Field application and validation." SPE Western Regional Meeting. OnePetro, 2017.

Ren, Guotong, et al. "Implementation of physics-based data-driven models with a commercial simulator." SPE Reservoir Simulation Conference. OnePetro, 2019.

Zalavadia, Hardikkumar, et al. "A hybrid modeling approach to production control optimization using dynamic mode decomposition." SPE Annual Technical Conference and Exhibition. OnePetro, 2019.

Emerick, Alexandre A., and Albert C. Reynolds. "Ensemble smoother with multiple data assimilation." Computers & Geosciences 55 (2013): 3-15.

Odeh, Aziz S. "Comparison of solutions to a three-dimensional black-oil reservoir simulation problem (includes associated paper 9741)." Journal of Petroleum Technology 33.01 (1981): 13-25.

Guo, Zhenyu, Albert C. Reynolds, and Hui Zhao. "Waterflooding optimization with the INSIM-FT data-driven model." Computational Geosciences 22.3 (2018).

Iino, Atsushi, et al. "Rapid compositional simulation and history matching of shale oil reservoirs using the fast marching method." SPE/AAPG/SEG Unconventional Resources Technology Conference. OnePetro, 2017.

Iino, Atsushi, et al. "Rapid simulation accounting for well interference in unconventional reservoirs using fast marching method." SPE/AAPG/SEG Unconventional Resources Technology Conference. OnePetro, 2020.

He, Jincong. Reduced-order modeling for oil-water and compositional systems, with application to data assimilation and production optimization. Stanford University, 2013.

\* cited by examiner

GRAPH NETWORK FLUID FLOW MODELING

CROSS-REFERENCE TO RELATED APPLICATION

This application claims priority to U.S. Provisional Application No. 63/110,521 filed Nov. 6, 2020 entitled "Graph Network Fluid Flow Modeling" by Sathish Sankaran, Wenyue Sun, and Sanjay Parani.

BACKGROUND

The present disclosure relates to methods and systems for modeling fluid flow dynamics in fluid systems. A challenge in modeling fluid flow dynamics is building reliable and fast predictive models that allow decisions to be made in the field. Some traditional numerical simulation models can be difficult to characterize, tedious to build and calibrate, and at times computationally prohibitive for short-term decision cycles in field applications. On the other hand, pure data-driven methods often lack physical insights and have a limited range of applicability. There is a need for a modeling method and system that is easy to build, history match, compute and interpret.

History matching and production optimization are two crucial components in modern fluid system management. In practice, these two components typically require the use of a commercial simulator for flow simulation. Some existing fluid modeling techniques calculate parameters of the fluid system explicitly based on properties of the fluid system model. This often requires other models to be calculated (e.g., geological models) and the solution of complex equations, which may require commercial simulators. Though computational power has increased significantly over the past few decades, the complexity and resolution of practical fluid models has also increased accordingly. For example, hydrocarbon reservoir flow simulation is often based on full 3D geo-cellular model and can take hours or days for large-scale field case, which makes efficient history matching and reservoir management exercises challenging, as many simulation runs are needed.

Existing techniques to improve reservoir simulation efficiency can speed up the simulation at various degrees; however, they generally start with a 3D geo-cellular model that may be difficult to build for complex systems. In addition, some of these methods are intrusive to the simulator, which is challenging to implement with a commercial simulator. Other models have drawbacks due to the limited physics that can be incorporated and simplifying assumptions that are required. Yet other models require constructing connections between well/connection pairs determined based on the Euclidean distance. In cases when strong heterogeneity or high permeability channels exist, such treatment may be problematic.

BRIEF DESCRIPTION OF THE DRAWINGS

These drawings illustrate certain aspects of some of the embodiments of the present disclosure and should not be used to limit or define the claims.

FIG. 6($a$) is a plot of data mismatch for the initial model and the iterations of history-matching processes with the observed data in accordance with certain embodiments of the present disclosure.

FIGS. 6($b$) and ($c$) are graphs illustrating both observed data and data from initial and updated models relating to WOPR for producer wells in accordance with certain embodiments of the present disclosure.

FIGS. 7($a$)-($c$) are graphs illustrating density plots of reservoir drainage volume data estimated from the initial and updated models in accordance with certain embodiments of the present disclosure.

FIG. 8($a$) is a plot of permeability distribution for a geological model having a channelized permeability field and an injector and producer well.

FIG. 8($b$) is a graph illustrating data relating to oil and water relative permeability curves for the geological model of FIG. 8($a$).

FIG. 9($a$) is a plot of data mismatch for the initial model and the iterations of history-matching processes with the observed data in accordance with certain embodiments of the present disclosure.

FIGS. 9($b$)-($d$) are graphs illustrating both observed data and data from initial and updated models relating to WWIR and WOPR for injector and producer wells in accordance with certain embodiments of the present disclosure.

FIGS. 10($a$)-($c$) are graphs illustrating density plots of reservoir drainage volume data estimated from the initial and updated models in accordance with certain embodiments of the present disclosure.

FIG. 12($a$) is a plot of data mismatch for the initial model and the iterations of history-matching processes with the observed data in accordance with certain embodiments of the present disclosure.

FIGS. 12($b$)-($j$) are graphs illustrating both observed data and data from initial and updated models relating to WWIR and WOPR for injector and producer wells in accordance with certain embodiments of the present disclosure.

FIGS. 13($a$)-($f$) are graphs illustrating density plots of reservoir drainage volume data estimated from the initial and updated models in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and systems for modeling fluid flow dynamics in fluid systems. In some embodiments, the modeling may include a graph network model, a history-matching process, or both.

More specifically, the present disclosure provides methods including providing an initial fluid system model including a plurality of nodes, each node characterized by one or more node fluid system parameters; and a plurality of edges between two of the plurality of nodes, each edge characterized by one or more edge fluid system parameters; and using the initial fluid system model, determining an updated fluid system model using a history-matching process.

In certain embodiments, the present disclosure provides systems for modeling fluid flow in a fluid system, including one or more processors; and a memory including a plurality of non-transitory executable instructions that, when executed, case the one or more processors to provide an initial fluid system model including a plurality of nodes, each node characterized by one or more node fluid system parameters; and a plurality of edges between two of the plurality of nodes, each edge characterized by one or more edge fluid system parameters; and using the initial fluid system model, determine an updated fluid system model using a history-matching process.

Among the many potential advantages to the methods and systems of the present disclosure, only some of which are alluded to herein, the methods and systems of the present disclosure may provide improved methods and systems for modeling fluid flow dynamics in fluid systems. For example, in certain embodiments, the methods and systems of the present disclosure may provide a fluid dynamics model that may be built using routinely measured field measurements (such as pressure and rates) and can be used for real-time forecasts, scenario modeling, optimization (e.g., production optimization) and control. In some embodiments, the methods and systems of the present disclosure may provide models with more efficient history matching than existing modeling techniques. In certain embodiments, the model may be a graph network model that may be solved with any commercial reservoir simulator, which may enable the model to be readily applied for various types of fluid physics.

Additionally, the methods and systems of certain embodiments of the present disclosure may provide a very compact model representation, in some instances requiring only a small number of discrete cells, that requires significantly less complexity compared with full-physics 3D models and leads to fast simulation. Such efficiency may make these models especially appealing for applications where many simulation runs are needed, such as routine model updating and well control optimization. In some embodiments, the models of the present disclosure may be lightweight and enable fast computation that facilitates scenario analysis and optimization. In certain embodiments, the methods and system of the present disclosure may not require a high fidelity geo-cellular model due to the reliance on assimilated observed data, and do not require a plethora of assumptions.

In certain embodiments, conventional graph network analysis algorithms may be applied to the graph networks of the present disclosure to provide additional insights to understand the fluid system. Additionally, in certain embodiments, the methods and systems of the present disclosure may involve calculating less fluid system parameters than certain existing modeling techniques. Moreover, certain embodiments of the present disclosure may provide a model that provides results that are simple and easy to understand and that are based on physically intuitive parameters.

When used to model a subterranean reservoir fluid system, the methods and systems of the present disclosure may, in certain embodiments, more efficiently enable connections between wells and eliminate the need for parameter pruning methods as compared to existing modeling methods. In certain embodiments, the model of the present disclosure may only discretize grid blocks for each well while retaining connectivity to all other wells, instead of the conventional discretized grid blocks for well pairs. This may reduce the number of grid blocks in the model of the present disclosure, leading to faster model simulation.

Figure 1:
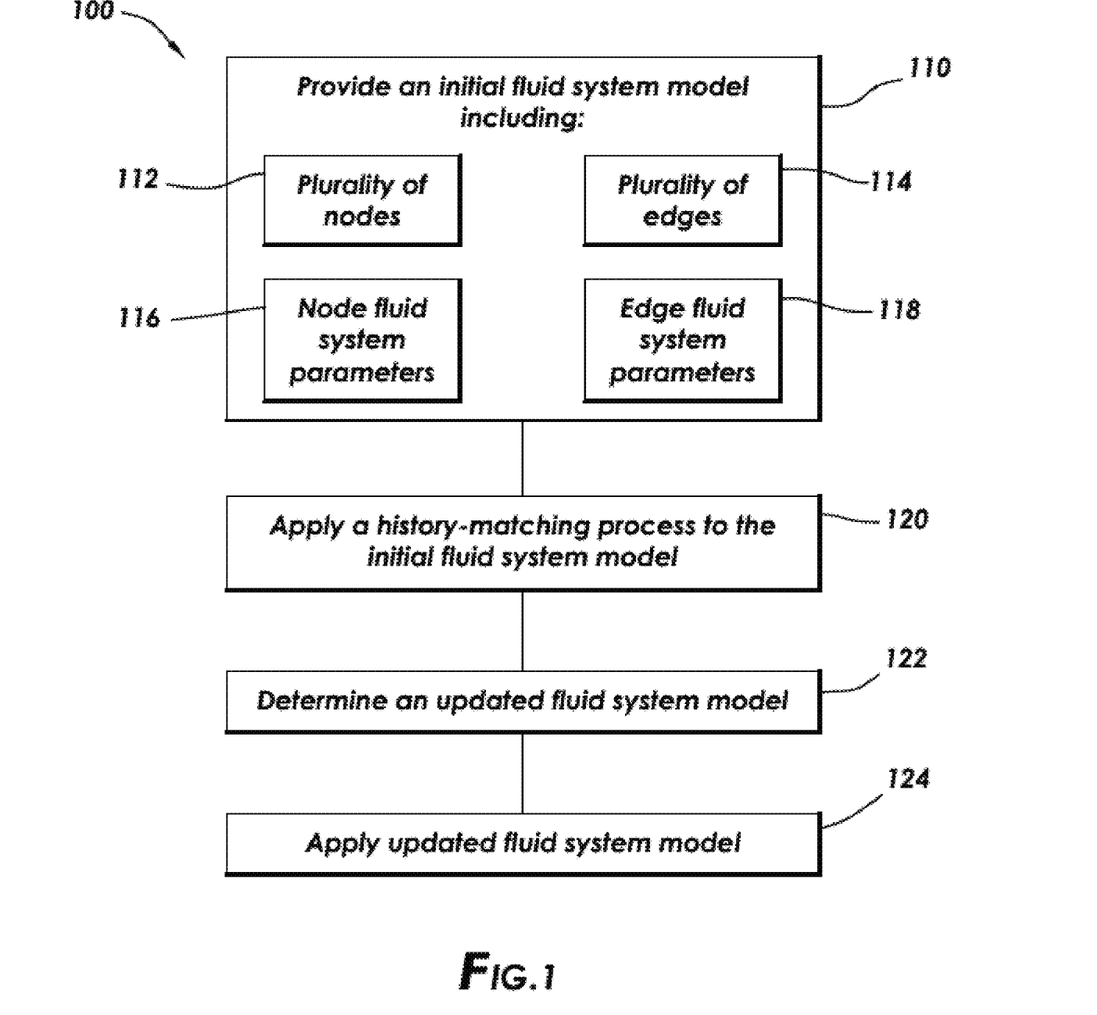
FIG. 1 is a process flow diagram illustrating a method for modeling fluid flow dynamics in a fluid system according to certain embodiments of the present disclosure.

FIG. 1 depicts a process flow 100 for modeling fluid flow dynamics in a fluid system. The use of arrows in FIG. 1 is not meant to require any particular order in which the methods of the present disclosure must be performed, and any order of performing these steps is contemplated by the present disclosure and claims. In certain embodiments, the system provides an initial fluid system model (block 110). In certain example implementations, the initial fluid system model includes a plurality of nodes 112 and a plurality of edges 114. In certain implementations, the system uses the initial fluid system model to apply a history-matching process (block 120) and determine an updated fluid system model (block 122). In certain implementations, the system updates the fluid system model using a history-matching process. Example implementations include using the updated fluid system model for an application (block 124).

The fluid systems modeled by the methods and systems of the present disclosure may include any fluid system for which data may be observed. In certain embodiments, fluid systems include, but are not limited to hydrocarbon reservoirs, groundwater reservoirs, pipelines, unit operations (e.g., distillation columns, heat exchangers, reactors), unit processes, wastewater treatment, refining operations, and the like.

In some embodiments, the process 100 includes selecting the number of cells and nodes and their arrangement in a graph network for the fluid system. The plurality of nodes 112 and the plurality of edges 114 may represent one or more components of a fluid system. A fluid system model may include one or more different types of nodes 112 related to the fluid system. For example, in certain embodiments, a reservoir fluid model including one or more wells and a subterranean reservoir may include a plurality of well nodes corresponding to wells and a plurality of cell nodes corresponding to portions of the reservoir. In other embodiments, a fluid pipeline model may include at least pipeline station nodes (e.g., source nodes and sink nodes), and pipeline transmission nodes (e.g., pressure drop nodes and pressure boosting nodes). In certain embodiments, a graph network for a fluid system may have node sub-types. For example, in certain embodiments, a reservoir fluid model may be characterized by additional types of nodes for each well, including inner cell nodes (e.g., cell nodes that do not communicate with cells associated with another well) and outer cell nodes (e.g., cell nodes that do communicate with cells associated with another well). In some embodiments, the number of inner cell nodes may be defined independently from the number of outer cell nodes.

In certain embodiments, each node 112 may be characterized by one or more node fluid system parameters 116. Node fluid system parameters 116 may include any parameter related to the fluid system, and may vary based on the type of fluid system. Examples of suitable node fluid system parameters 116 include, but are not limited to fluid holdup capacity, friction factor, pressure discharge coefficient, pore volume, well productivity index, well injectivity index, and the like, and any combination thereof.

A fluid system model also may include one or more different types of edges 114 related to the fluid system. For example, in certain embodiments, a reservoir fluid model may include well-cell edges between well nodes and cell nodes and cell-cell edges between two cell nodes. In other embodiments, a fluid pipeline model may include station-transmission edges between station nodes and transmission nodes and transmission-transmission edges between transmission nodes.

In certain embodiments, each edge 114 may be characterized by one or more edge fluid system parameters 118. Edge fluid system parameters 118 may include any parameter related to the fluid system, and may vary based on the type of fluid system. Examples of suitable edge fluid system parameters 118 include, but are not limited to transmissibility, interpretation transmissibility, friction factor, pressure potential coefficient, diffusivity coefficient, and the like, and any combination thereof. In certain embodiments, transmissibility is a parameter characterizing fluid flow within a partition of a fluid system (e.g., intra-well fluid flow for a reservoir fluid model) and interpartition transmissibility is a parameter characterizing interference between partitions of a fluid system (e.g., inter-well fluid flow for a reservoir fluid model).

In certain embodiments, the number of cells and nodes and the characteristic parameters for each node and cell are selected, initial given ranges for each parameter are selected. The initial given ranges may be selected based on prior knowledge, prior data, estimation, numerical calculation, or any combination thereof. Once the number of nodes and cells and the characteristic parameters are identified, the number of uncertain parameters ($n_t$) is known. In certain embodiments, the prior distributions of the parameters are assumed to be uniform within a given range for each parameter. In certain embodiments, the prior distributions of the parameters are assumed to be uniform, gaussian, triangular, log-normal, or the like, within a given range for each parameter.

Figure 3:
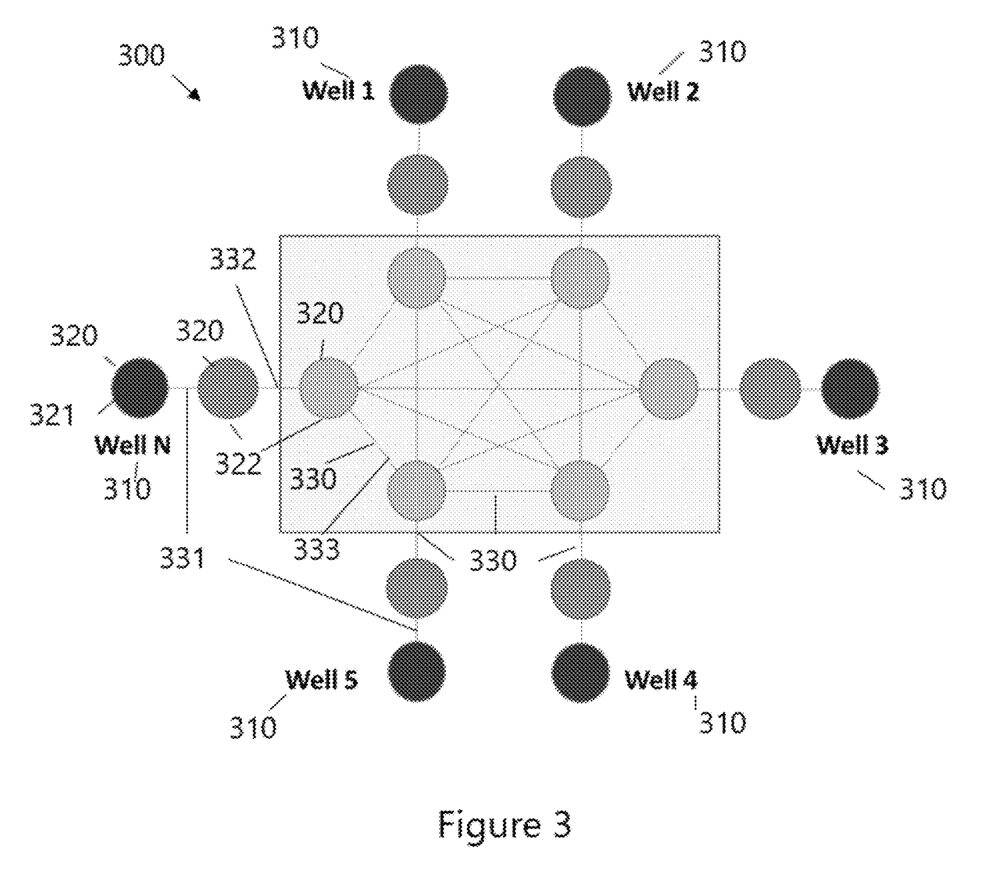
FIG. 3 is a schematic diagram of a graph network of a hydrocarbon reservoir in accordance with certain embodiments of the present disclosure.

A series of models may be generated and simulated based on the given ranges of uncertain parameters, the known parameters (the number of well and cell nodes), and the arrangement of the well and cell nodes for the fluid system (e.g., as shown in the graph network of FIG. 3). The well and cell nodes may be initialized with node fluid system parameters and edge fluid system parameters to define an initial fluid system model 100. In certain embodiments, multiple realizations of the initial fluid system model (e.g., 2 or more) is generated and simulated to provide an initial fluid system model 100. For example, multiple realizations of the initial fluid system model (e.g., 2 or more) may be generated and simulated by varying the node fluid system parameters and edge fluid system parameters across their given ranges to provide an initial fluid system model 100. In certain embodiments, about 100 models are generated and simulated to provide an initial fluid system model 100. In other embodiments, the number of models generated at this stage may range from about 10 to about 500, from about 10 to about 300, from about 10 to about 250, from about 10 to about 200, or from about 10 to about 150. In some embodiments, more than 10 models are generated and simulated to form an initial fluid model.

In some embodiments, the generated and simulated data may be compared to previously-observed data to confirm that the modeled data encompasses the observed data, and, if it does not, revisit at least one of the given ranges and the types of parameters in the model. In certain embodiments, the previously-observed data comes from a history-matching period used in the flow process 100 of the present disclosure, which may be multiple time steps (e.g., 2 or more time steps). In certain embodiments, the time steps may be days, weeks, months, or any other suitable time step. In some embodiments, the history-matching period may be 500 time steps (e.g., 500 days) or from about 50 to about 1,000 time steps, from about 200 to about 800 time steps, or at least 100 time steps.

An updated fluid system model 122 may be determined using one or more history-matching processes 120. In certain embodiments, the updated fluid system model 122 may be determined by using one or more history-matching processes 120 to update one or more of the node fluid system parameters and/or the edge fluid system parameters. In some embodiments, the history matching process may be run more than one time, more than two times, more than three times, between 1 and 20 times, between 1 and 10 times, or between 1 and 5 times, in order to determine an updated fluid system model. In certain embodiments, the history matching process is run with a constant inflation factor. In other embodiments, the history matching process is run with a variable inflation factor for each iteration. The history-matching process used to determine the parameters of the provided model 110 may be the same or different from the history-matching process used to determine the updated fluid system model 122.

The history-matching process 120 may include one or more history-matching processes that perform parameter updating using deterministic or probabilistic approaches. Examples of suitable history-matching processes 120 include, but are not limited to ensemble smoothing multiple data assimilation (ES-MDA), gradient descent (e.g., Newton-Raphson), stochastic optimization (e.g., particle swarm optimization, simulated annealing, genetic algorithm), ensemble Kalman filters, manual search, and the like, and any combination thereof. A suitable history-matching process may be selected based at least in part on the modeling purpose and uncertainty management needs. In some embodiments, the updated fluid system model is determined using an ensemble smoothing multiple data assimilation (ES-MDA) process. In certain embodiments, the ES-MDA process is a history-matching process that performs parameter updating.

In certain embodiments of the present disclosure related to a reservoir fluid model, a data assimilation process may be used to determine updated parameters including, but not limited to an updated edge transmissibility, an updated interpartition transmissibility, an updated node well productivity index, an updated cell pore volume, and any combination thereof.

Figure 2:
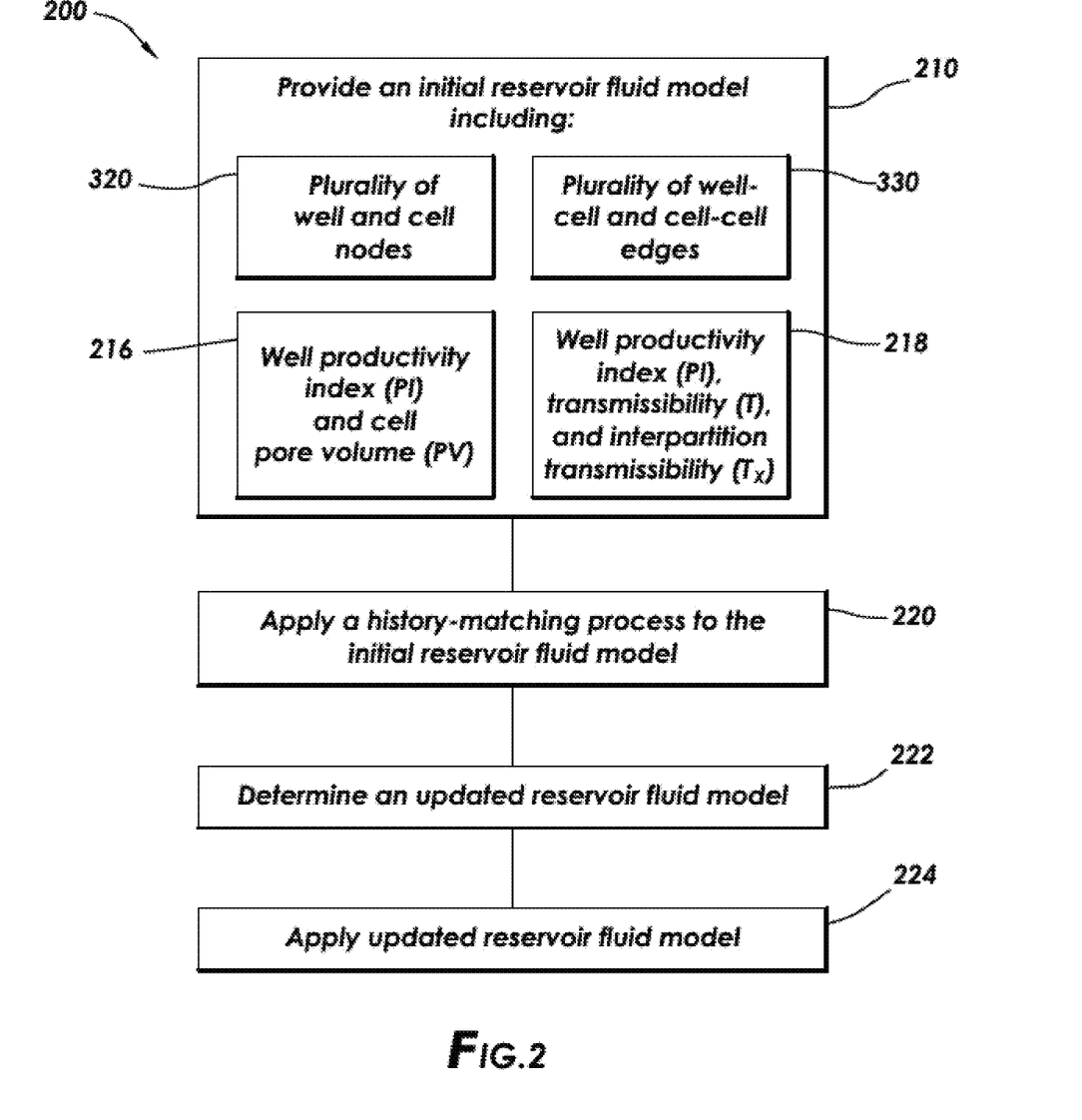
FIG. 2 is a process flow diagram illustrating a method for modeling fluid flow dynamics in a subterranean reservoir fluid system according to certain embodiments of the present disclosure.

For example, and with reference to FIG. 2, a process flow 200 similar to that of FIG. 1 could be implemented for a subterranean reservoir including a plurality of wells. The use of arrows in FIG. 2 is not meant to require any particular order in which the methods of the present disclosure must be performed, and any order of performing these steps is contemplated by the present disclosure and claims. FIG. 2 depicts the process flow 200 applied to model a hydrocarbon reservoir as represented by the schematic representation shown in FIG. 3. As shown in FIG. 3, the reservoir graph network model (RGNet) 300 is represented by a graph network of N wells 310, as represented by nodes 320 and edges 330. The nodes 320 include well nodes 321 and cell nodes 322. Each node 320 may be characterized by at least a pore volume parameter. The edges 330 represent the connection between different nodes 320. The edges 331 connecting a well node 321 to cell node 322 may be characterized at least by a well productivity index parameter. The edges 332 connecting two cell nodes 322 that belong to the same well 310 may be characterized at least by a transmissibility (T) parameter as the weight attribute. The edges 333 connecting two cell nodes 322 that belong to different wells 310 are characterized by inter-partition transmissibility ($T_x$) as the weight attribute. In certain embodiments, conventional graph analysis algorithms can be applied to the graph network of FIG. 3 to provide additional insights to understand the reservoir.

The physics within the cell nodes 322 may be any suitable physics, including, but not limited to single porosity, dual porosity, single phase flow, multiphase flow, a fracture network, and the like. Additionally, the outermost cell nodes for a particular well 310 may include any suitable boundary condition, including, but not limited to no flow boundary, constant pressure, constant flux, aquifer condition, and the like. A person of skill in the art with the benefit of this disclosure would understand which physics would be suitable for the cell nodes 322 and which boundary conditions would be suitable for the outermost cell nodes for a particular reservoir and/or application.

With reference to FIG. 2, the process flow 200 is a method for modeling fluid flow dynamics in a reservoir fluid system comprising providing an initial reservoir fluid model 210 including a plurality of nodes 320 and plurality of edges 330 as depicted in FIG. 3. The system provides an initial reservoir fluid model (block 210). In certain example implementations, the fluid system includes a subterranean fluid reservoir and one or more wells 310. The plurality of nodes 320 comprise a plurality of well nodes 321, each corresponding to a well, and a plurality of cell nodes 322, each corresponding to a portion of the reservoir. In some embodiments, each node 320 may be characterized by one or more node reservoir fluid system parameters 216. In certain embodiments, each well 321 node is characterized by a well productivity index (PI), and each cell node 322 is characterized by a cell pore volume (PV). In some embodiments, each edge 330 may be characterized by one or more edge reservoir fluid system parameters 218. The plurality of edges 322 comprise a plurality of well-cell edges 331 between one well node 321 and one cell node 322 and a plurality of cell-cell edges 332, 333 between two cell nodes. In certain embodiments, each well-cell edge 331 is characterized by a well productivity index, and the characteristic parameter of each cell-cell edge 332, 333 depends on whether the cell-cell 332, 333 edge is between cells 322 associated with the same well 310 or between cells 322 associated with two different wells 310. For example, if the cell-cell edge 332 is between cells 322 associated with the same well 310, it may be characterized by a transmissibility (T), and if the cell-cell edge 333 is between cells 322 associated with two different wells 310, it may be characterized by an inter-partition transmissibility ($T_x$).

In certain embodiments, providing the initial reservoir model 210 may include selecting the number of inner cells/nodes for each well ($n_i$) and the number of outer cells ($n_o$) for each well. The number of inner cells/nodes for each well refers to those cells and nodes that will not communicate with cells belonging to a different well. The number of outer cells refer to those cells that may communicate with cells belonging to a different well. The parameters $n_i$ and $n_o$ may be the same or different for each well, and may be treated as hyper-parameters, since the dimension of the other parameters (e.g., PV, PI, T, and $T_x$) will depend on $n_i$ and $n_o$. Once $n_i$ and $n_o$ are selected, the number of uncertain parameters ($n_t$) is known. Once the number of cells and nodes are selected, initial given ranges for each parameter (PV, PI, T, and $T_x$) are selected. The initial given ranges may be selected based on prior knowledge, prior data, estimation, numerical calculation, or any combination thereof. Once the number of nodes and cells and the characteristic parameters are identified, the number of uncertain parameters ($n_t$) is known. In certain embodiments, the prior distributions of the parameters are assumed to be uniform, gaussian, triangular, log-normal, or the like, within a given range for each parameter.

For example, in certain embodiments, the given range for the well productivity indices (PI) may be from about 1 to about 10, the given range for the cell pore volumes (PV) may be from about $1 \times 10^5$ to about $1 \times 10^8$, the given range for the inner cell transmissibility (T) may be from about 1 to about 20, and/or the given range for the outer cell transmissibility ($T_x$) may be from about 1 to about 20.

In certain embodiments, the prior distributions of the parameters are assumed to be uniform within a given range for each parameter, and an initial ensemble of models are generated by randomly sampling each individual parameter. For example, in certain embodiments, a series of models are generated and simulated based on the given ranges of uncertain parameters, the known parameters ($n_i$, $n_o$, and $n_t$) and the arrangement of the cells and nodes (e.g., as shown in the graph network of FIG. 3) for the subterranean reservoir. In certain embodiments, the initial reservoir fluid model 210 is provided by generating and simulating about 100 models based, at least in part, on the given ranges of uncertain parameters, the known parameters ($n_i$, $n_o$, and $n_t$) and the arrangement of the cells and nodes (e.g., as shown in the graph network of FIG. 3) for the subterranean reservoir. In other embodiments, the models generated at block 210 may range from about 10 to about 500, from about 10 to about 300, from about 10 to about 250, from about 10 to about 200, or from about 10 to about 150. In some embodiments, more than 10 models are generated and simulated to provide an initial reservoir fluid model 210.

In some embodiments, the generated and simulated data is compared to previously-observed data at this stage to confirm that the modeled data encompasses the observed data, and, if it does not, revisit at least one of the given ranges and the types of parameters in the model.

Using the initial reservoir system model provided in 210, the system applies a history-matching process to the initial reservoir fluid model (block 220) and determines an updated fluid system model (block 222). For example, in certain embodiments, an ES-MDA algorithm may be applied to the initial reservoir model in order to reduce the error and/or mismatch between the initial model data and the observed data. In some embodiments, four iterations, six iterations, or eight iterations, of the ES-MDA algorithm may be applied with constant inflation factors at each iteration in order to determine an updated reservoir model.

In certain embodiments, the updated reservoir fluid model is used to perform one or more applications based, at least in part, on the updated model (block 224). In example implementations, the system determines performance data for a reservoir, such as a reservoir pressure, a reservoir flow rate, a well pressure, a well flow rate, or a combination thereof. In certain example embodiments, the fluid system model may be used for forecasting. In certain example embodiments, the fluid system model may be used for well deliverability analysis. In certain example embodiments, the fluid system model may be used for flood optimization (for example, gas, water, polymer or combination). In certain example embodiments, the fluid system model may be used for production control optimization. In certain example embodiments, the fluid system model may be used for integrated subsurface and surface network analysis.

The updated fluid system models generated by process flow 100 and process flow 200 may be used in a variety of applications and operations related to the fluid systems to which they relate (block 224).

For example, the updated fluid system models may be used to forecast fluid system conditions, perform analyses of the fluid systems, design operations related to the fluid system, design equipment and/or facilities related to the fluid systems, and the like, and any combination thereof. For example, in certain embodiments, energy operators may routinely perform production forecasting and planning activities based on historical well performance. In certain embodiments, the predicted future well performance may further include the prediction of an of hydrocarbons and/or water that are to be injected into the formation Future well performance may be predicted over one or more time intervals. Example time intervals may be a week, a month, a quarter, or a year.

These forecasts may include one or more production scenarios including various well configurations, well schedule, artificial lift installations, workovers etc. These may include altering the conditions (e.g. pressures and injection rates) at which the wells may be operated in future, compared to historical performance. In certain cases, the forecasts are also used for hydrocarbon marketing and reserves estimation. Additionally, these may also be used in evaluating future needs such as facility expansion or modification to handle produced and injected fluids compared to initial or current operating conditions. Having a reliable, timely and accurate forecast is essential in proper planning of these field operations for short-term and long-term purposes. Some traditional forecasting methods are based on decline curve analysis, numerical simulation models or other methods, which have several limitations.

In certain embodiments, the decline curve analysis is a rate-based method and does not include the pressure data to provide accurate forecasts. In some embodiments, the decline curve analysis is valid when the production from the well experiences decline under constant bottomhole pressure. Often, this is not the case as routine surface operations vary the bottomhole pressure or the well is choked back so that the well does not exhibit its natural decline. The numerical simulation is based on a grid-based model that requires detailed geological description of the reservoir. Often, these models are time consuming to build, validate, history match, maintain and operate. As a result, these models are updated at less frequency than the forecasting business process (e.g. weekly, monthly). In contrast, certain embodiments of the model combine pressure and rate data that can serve the above forecasting cycles at sufficient fidelity required for the planning process.

For example, in some embodiments, the updated reservoir fluid model generated by process flow 200 may be used, at least in part, to forecast production from the reservoir, perform well deliverability analysis, perform reservoir connectivity analyses, control production from the reservoir, control a flooding operation of the subterranean fluid reservoir, and/or design an integrated subsurface and surface network.

Well deliverability is a metric that tracks the health of the near wellbore region that is primarily influenced by reservoir energy (for example, as measured by reservoir pressure) and resistance to flow between the reservoir and the wellbore (for example. productivity or injectivity index). Any degradation of well deliverability may need to be promptly estimated, mitigated and/or restored to maintain the well flowing rates. Thus, well deliverability analysis may be used to plan well workover or well restimulation activities. These activities may include one or more of acid jobs, xylene treatments, and chemicals bullheading.

In certain example embodiments, the model provides continuous estimation and tracking of well deliverability that can be directly used for well surveillance and production planning activities. In certain example implementations, well deliverability is measured through a normalized metric such as productivity index (PI). In certain implementations, the estimated model parameters can be tracked over time and any PI degradation over time can be used as a production surveillance tool to alert abnormal operation that may trigger a prompt response to intervene and arrest further degradation to restore well productivity.

In certain embodiments, the updated reservoir fluid models may be used for one or more of short-term forecasting, long-term forecasting and long-term production profiles from routine measurements (for example, rates and pressure). The updated inter-well transmissibility parameters between well pairs may also provide insights into well connectivity in certain embodiments, including in pattern floods and well interference analysis.

Understanding reservoir connectivity helps to determine the number, timing, and sequence of wells to be drilled for optimum field development. These wells may include either or both producer wells and injector wells. Often, field appraisal data acquisition programs are not adequate to eliminate uncertainties in reservoir connectivity. Too many wells drilled in a small reservoir compartment may result in well interference and fast reservoir declines leading to inefficient capital deployment. Too few wells drilled in a large reservoir compartment may result in bypassed oil or inefficient extraction of hydrocarbons. Further, if secondary recovery (e.g. water, gas or polymer injection) is underway, understanding strengths of hydraulic connectivity between wells is critical for efficient flood conformance.

In certain example embodiments, the inter-well transmissibility parameters estimated as part of model can provide direct insights for reservoir connectivity analysis. Higher magnitudes of estimated inter-well transmissibility parameters signify strong connectivity between the wells. This can be helpful in understanding reservoir connectivity, especially in the presence of compartmentalized reservoirs. This enhanced of reservoir connectivity may be useful for optimal field development and avoiding unnecessary drilling of wells that either compete for same resources or leave behind unswept hydrocarbons.

In certain embodiments, (for example, those involving primary depletion reservoirs (with or without aquifer support or gas cap), an updated reservoir fluid model may be used to optimize well control to maximize objectives (for example, economic criteria, increase oil recovery, minimize undesired water or gas breakthrough, etc.).

Mature oil fields in sandstone reservoirs (and sometimes carbonate reservoirs) are often characterized by natural aquifer drive, artificial water drive, or a combination of both. These mature fields feature high water cut and high recovery efficiency. Water flood, polymer flood or alkali/surfactant/polymer (ASP) flood can improve recovery efficiency anywhere from 5 to 30%.

A major problem for waterflooded fields is that, with increased water/oil ratio (WOR), the cost of processing produced fluid increases to exceed the breakeven costs. As a result, many wells are forced to be shut in, and in some cases, the entire field may be suspended.

In certain example embodiments the models of the present disclosure (which may be referred to as RGNet) are used to determine various well configurations for production and injection strategies to maximize hydrocarbon recovery and extend the life of the field. This may involve adjusting the current production rates, injection rates, or equivalently, their well pressures, up or down. Note that this is a temporal correction, and the process may be repeated several times (for example, daily, weekly, monthly, quarterly, annually etc.). In certain cases, the injectors may be shutoff completely to improve areal sweeping volumes. Sometimes, the wells may also be converted from a producer to an injector, or vice versa. In some cases, injector may be operated cyclically to establish pressure pulsing in order to change the shape, position, and size of remaining oil.

Additionally, the updated reservoir fluid model may be used for secondary recovery mechanisms to determine the strength of connections between injectors and producers and optimize both injection rates and producer well control simultaneously to maximize objectives (e.g., economic criteria, increase oil recovery, minimize undesired water or gas breakthrough etc.). In some embodiments, the speed of convergence of the methods of the present disclosure are well-suited for designing optimal surface networks, realistic life-of-field modeling, analyzing interconnected production networks across reservoirs at the surface and short-term production optimization.

Example embodiments include one more Integrated Asset Models (IAM). IAM refers to simultaneously modeling both the subsurface and surface elements in an oil or gas field. Historically, the reservoir has been modeled separately from the surface network and the facilities. To capture the interaction between those two or more standalone models, several time-consuming iterations are required. Existing technologies use physics-based solvers that may implicitly or explicitly solve subsurface and surface network elements together. Because the flow phenomena that occur at the reservoir scale and wellbore/pipe scale are quite different, solving these problems with traditional physics-based approach is time consuming. As are result, the subsurface is simplified into a very coarse model (e.g. tank) to keep computational time minimum at the loss of subsurface model accuracy over long periods of time. It is desirable to keep the subsurface accuracy, while not compromising on the speed during integration with surface network that is required for continuous production optimization.

The nodes defined in model can be extended beyond the subsurface to include the wellbore and subsea or surface network elements to construct an integrated asset model (IAM). The pressure at the surface network nodes will drive the rates across the edges connecting these nodes. The model-based IAM can be used for integrated production optimization based on installed equipment that captures the bottlenecks in the system. In debottlenecking studies, alternate pipeline or routing configurations can be evaluated rather quickly. Similarly, the impact of various equipment sizing (e.g. pipe length, pipe diameter, pump head, pump power, pump speed, control valve setting, etc.) can also be evaluated to select the optimum overall equipment design and production method. The model-based IAM computations can be repeated several times (e.g. daily, weekly, monthly, quarterly, annually etc.) as necessary.

Figure 4:
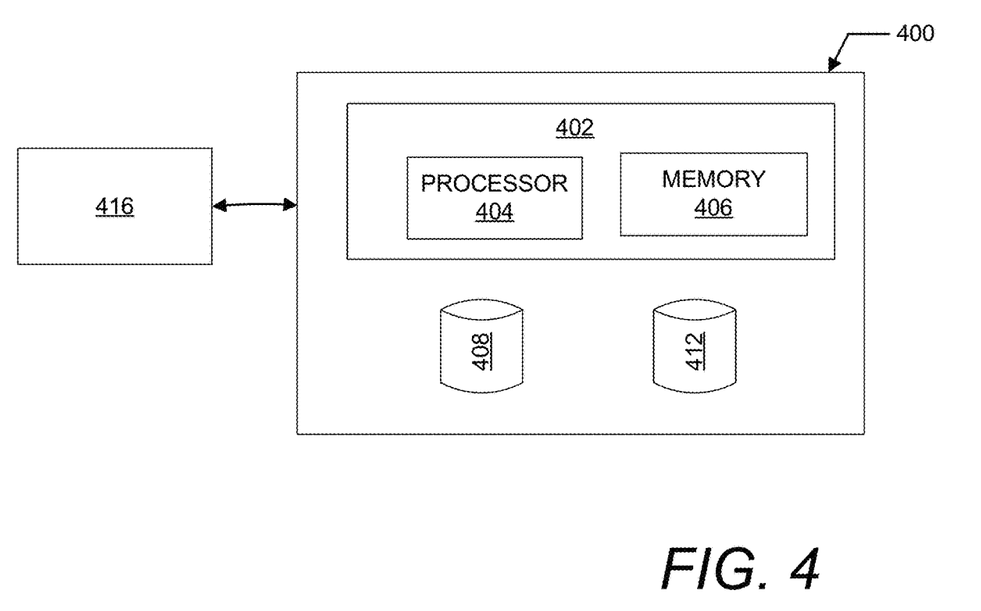
FIG. 4 is a block diagram showing an example information handling system in accordance with certain embodiments of the present disclosure.

FIG. 4 is a block diagram of an exemplary control unit 400 in accordance with some embodiments of the present disclosure. In certain example embodiments, control unit 400 may be configured to create and maintain a first database 408 that includes information concerning one or more fluid system. In other embodiments the control unit 400 is configured to create and maintain databases 408 with information concerning one or more fluid systems. In certain example embodiments, control unit 400 is configured to use information from database 408 to train one or many machine learning algorithms 412, including, but not limited to, artificial neural network, random forest, gradient boosting, support vector machine, or kernel density estimator. In some embodiments, control system 402 may include one more processors, such as processor 404. Processor 404 may include, for example, a microprocessor, microcontroller, digital signal processor (DSP), application specific integrated circuit (ASIC), or any other digital or analog circuitry configured to interpret and/or execute program instructions and/or process data. In some embodiments, processor 404 may be communicatively coupled to memory 406. Processor 404 may be configured to interpret and/or execute non-transitory program instructions and/or data stored in memory 406. Program instructions or data may constitute portions of software for carrying out fluid system modeling, as described herein. Memory 406 may include any system, device, or apparatus configured to hold and/or house one or more memory modules; for example, memory 406 may include read-only memory, random access memory, solid state memory, or disk-based memory. Each memory module may include any system, device or apparatus configured to retain program instructions and/or data for a period of time (e.g., computer-readable non-transitory media).

Although control unit 400 is illustrated as including two databases, control unit 400 may contain any suitable number of databases and machine learning algorithms. Control unit 400 may be communicatively coupled to one or more displays 416 such that information processed by sensor control system 402 may be conveyed to operators at or near the pipeline or flowline or may be displayed at a location offsite.

Modifications, additions, or omissions may be made to FIG. 4 without departing from the scope of the present disclosure. For example, FIG. 4 shows a particular configuration of components for control unit 400. However, any suitable configurations of components may be used. For example, components of control unit 400 may be implemented either as physical or logical components. Furthermore, in some embodiments, functionality associated with components of control unit 400 may be implemented in special purpose circuits or components. In other embodiments, functionality associated with components of control unit 400 may be implemented in a general purpose circuit or components of a general purpose circuit. For example, components of control unit 400 may be implemented by computer program instructions. In particular, the IAMB described above may be implemented by computer program instructions.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples demonstrate the application of the methods of the present disclosure to hydrocarbon reservoir fluid systems, specifically as applied to a homogeneous model with primary depletion, and to two heterogenous models with waterflooding. For each example, a full physics simulation was run to generate reference production data. Observed production data was then generated synthetically by adding random noise to the reference data. We applied the modeling methods of the present disclosure to Society of Petroleum Engineers (SPE) benchmark reservoir simulation models for single well, multi-well with interference and injector-producer pairs. The calibrated models were used to quantify uncertainty for production forecasting.

As explained below, in all examples, the models of the present disclosure effectively and efficiently reduced the range of uncertainty and provided reasonable estimates of reservoir and well drainage volumes. Additionally, due to reduced complexity as compared to other models, the models of the present disclosure remained highly scalable while still retaining physical interpretability in terms of pore volume and transmissibility.

In each example, the same values were used for $n_1$, the number of inner cells/nodes for each well, and $n_o$, the number of outer cells for each well. In these examples, each well node is characterized by a well productivity index (PI), each cell node is characterized by a cell pore volume (PV), and each well-cell edge is characterized by a PI. The cell-cell edges that are between cells associated with the same well are characterized by a transmissibility (T), and the cell-cell edge that are between cells associated with two different wells are characterized by an interpartition transmissibility ($T_x$). So the number of uncertain parameters ($n_t$) for these examples is: $n_t = n_{pi} + n_{pv} + n_T + n_{Tx}$, where $n_{pi}$, $n_{pv}$, $n_T$, and $n_{Tx}$ denote the number of parameters for productivity index, pore volume, intra-well transmissibility and inter-well transmissibility, respectively. By letting $n_i$ denote the number of wells, the total number of uncertainty parameters is $n_t = n_w + 2n_w \times (n_1 + n_o) + n_o n_w (n_w - 1)/2$.

Example 1

In this example, the methods of the present disclosure were used to test the capability of a graph network model of the present disclosure to match historical data and to generate reliable predictions. The observed data were generated by adding random noise to the simulated results from a full-physics simulator that solves the black-oil flow equations on the full geological model shown in FIG. 5. The data generated from the full-physics simulator is referred to as the "true" data.

Figure 5:
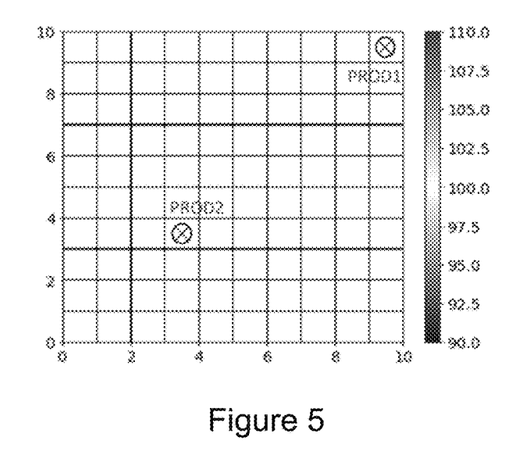
FIG. 5 is a plot of permeability distribution for a homogenous geological model including two producing wells.

The observed data was generated using a 2D homogeneous model adapted from the SPE1 benchmark model as described in Odeh, A. S. (1981), Comparison of Solutions To a Three-Dimensional Black-Oil Reservoir Simulation Problem. *JPT, Journal of Petroleum Technology*, 33(1), 13-25, which is incorporated herein by reference for all purposes. As shown in FIG. 5, the geological model for this example is represented on a 10×10 grid, with each grid block 510 having a size of 1,000 ft×1,000 ft×50 ft. FIG. 5 shows an isotropic permeability field with a constant value of 100 millidarcy (md) and a reservoir with uniform porosity of 0.3. There were two producing wells PROD1, PROD2 that operate from day zero under a fixed bottom hole pressure (BHP) control of 3,500 pounds per square inch (psi). The reservoir had an initial pressure of 8,400 psi. The initial water and oil saturations were 0.18 and 0.82, respectively, and oil viscosities at standard conditions were 1.157 centipoise (cp). The total reservoir pore volume was $2.67 \times 10^8$ reservoir barrels (rb).

Figure 6:
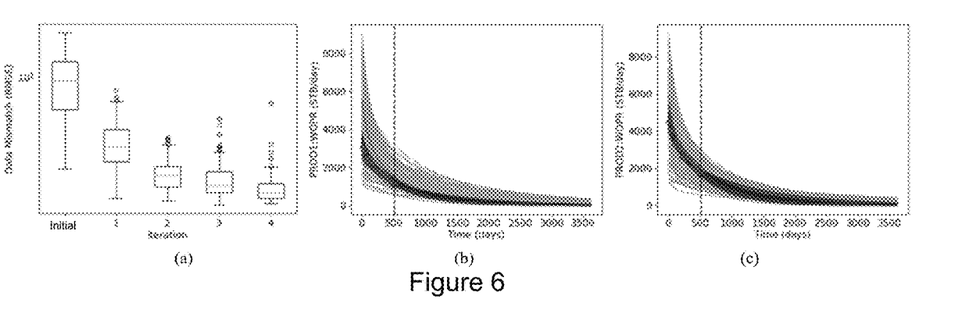

The history-matching period was the first 500 days. During this period, monthly oil production rate (OPR) for both wells were measured. FIGS. 6(b) and 6(c) present the true data, shown as a solid red curve, and the observed data (red dots) at well PROD1 and PROD2, respectively. Standard deviation of noise, or measurement error, is specified to be 5% of the corresponding rate data. The vertical dashed black line separates the historical and forecasting periods.

The number of inner and outer cells was set to two for both wells PROD1, PROD2, which leads to $n_t = 20$ uncertainty parameters. The prior distributions of these parameters were assumed to be uniform within a given range, and an initial ensemble of graph network models were generated by randomly sampling each individual parameter. For this case, the initial ranges for each parameter were: well productivity index (PI): [1, 10]; cell pore volumes: [$1 \times 10^5$, $1 \times 10^8$]; inner cell transmissibility: [1, 20]; and outer cell transmissibility: [1, 20].

A total of 100 graph network models were generated and simulated based on the ranges of parameters, $n_o$, $n_i$, and the arrangement of the cells and nodes in the graph network to form an initial reservoir fluid model. The results are shown in FIGS. 6(b) and 6(c) as gray curves for wells PROD1 and PROD2, respectively. As shown in FIGS. 6(b) and 6(c), the initial reservoir fluid model encompasses the observed data.

Next, an ES-MDA data assimilation process was applied to the initial model to determine an updated reservoir fluid model. Four iterations of ES-MDA was applied with constant inflation factors at each iteration. At each iteration, the data mismatch was computed against the observed data, represented in the form of root-mean-square error (RMSE) normalized by the measurement error. The data mismatch term quantifies how far the predictions are away from observed data in terms of error standard deviation. For example, a data mismatch of 5 indicates that, on average, the predictions are 5 standard deviation away from the observed data. The data mismatch evolution in this example is shown in FIG. 6(a), which shows that the error is reduced by about one order of magnitude. The predictions from the 100 history-matched updated models are shown in FIGS. 6(b) and 6(c) as blue curves. FIGS. 6(b) and 6(c) show that the updated reservoir fluid models of the present disclosure match the observed data (red dots) very well and provide a range of forecasts that encompass the true data (red curves).

Figure 7:
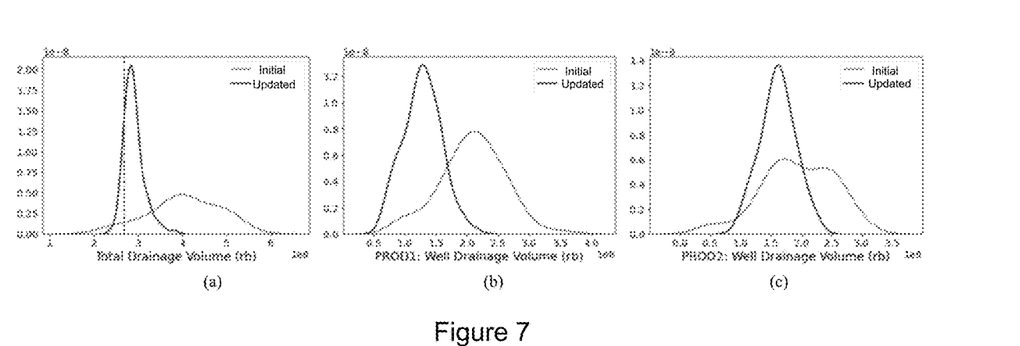

FIG. 7(a) shows the density plot of total drainage volume obtained from the initial and updated reservoir fluid models, as well as the true reservoir total pore volume. FIG. 7(a) shows that the true total pore volume (dashed vertical line) is at the smaller end of the total drainage volume distribution for the initial reservoir fluid model (grey curve), while the total drainage volume distribution for the updated model (blue curve) is much closer to the true total pore volume. In addition, the updated model's distribution is much narrower, which denotes reduced model uncertainty after conditioning the initial model to historical data. Since the system considered in this section is primary depletion, the total drainage volume is expected to be the same as the true reservoir pore volume once sufficient production time is reached.

FIGS. 7(b) and (c) display the initial model and updated model distribution of total drainage volume associated with well PROD1 and PROD2, respectively. As shown in FIGS. 7(b) and (c), the range of uncertainty has been reduced after history matching to production data. Additionally, the estimated drainage volume for well PROD2 is larger than that for well PROD1 in terms of overall distribution. This result is consistent with the model setup shown in FIG. 5, in that well PROD2 is located closer to the center of reservoir and has access to a larger portion of the fluid volume compared with well PROD1.

Example 2

Figure 8:
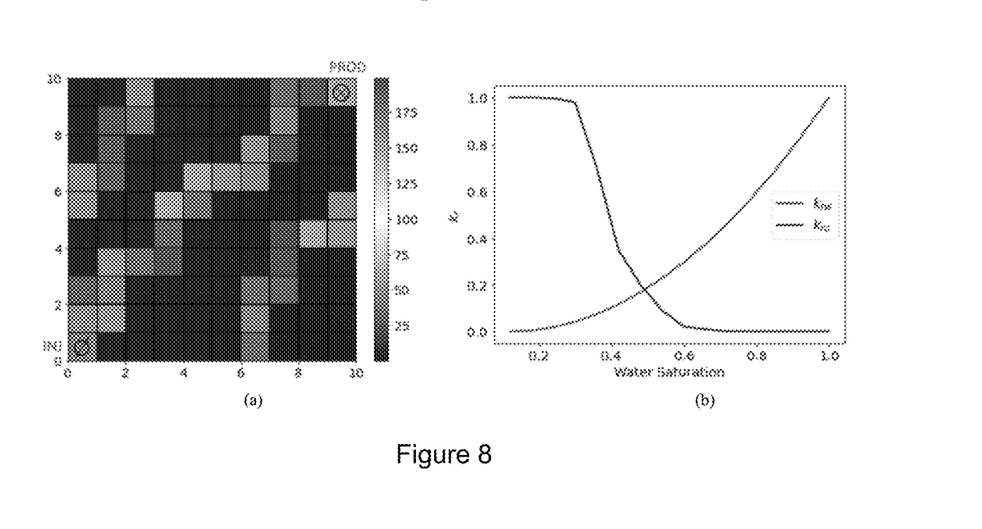

In this example, the observed data was generated using a channelized model with large permeability contrast between sand and mud facies. The permeability distribution is shown in FIG. 8(a). The average permeability of sand and mud facies is about 175 md and 0.55 md, respectively. There is a high permeability path that connects the injector (INJ) and producer (PROD) that are located at the corners. Similar to Example 1, the geological model of this example is also represented on a 10 by 10 grid block, and each grid block is of size 400 ft×400 ft×50 ft. The porosity is specified to be constant at 0.3. The injector (INJ) and producer (PROD) operate at constant BHP control of 9,000 psi and 3,500 psi, respectively. Initial conditions are the same as Example 1. Water and oil viscosities at standard conditions are 0.318 cp and 1.157 cp, respectively. The relative permeability curves for water and oil are shown in FIG. 8(b). Capillary pressure effects are ignored. The reservoir has total pore volume of $4.27 \times 10^7$ rb. The total pore volume of channel connecting injector and producer is $8.54 \times 10^6$ rb.

Figure 9:
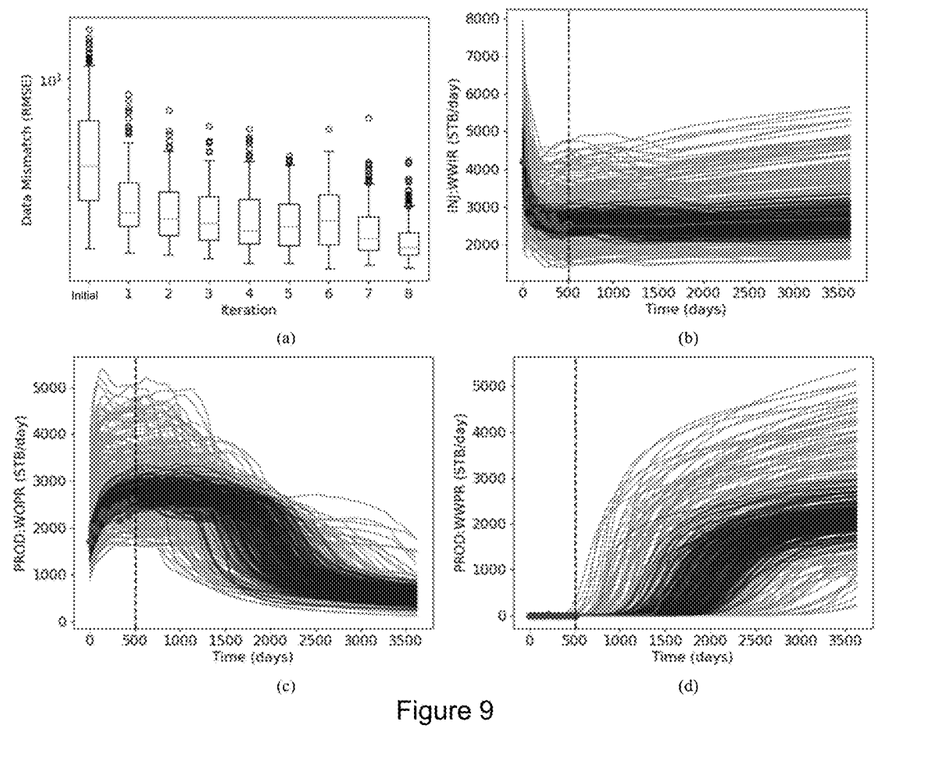

In this example, the graph network for the model of the present disclosure was constructed with two inner cells and two outer cells for each well. The number of parameters was the same as Example 1. The range of parameter prior distributions were determined with limited numerical experimentation to have prior predictions covering the observed data. The historical period was again the first 500 days, with monthly-observed well water injection rate (WWIR), well water production rate (WWPR), and well oil production rate (WOPR). A total of 100 graph network models were generated and simulated based on the ranges of parameters, $n_o$, $n_i$ and the arrangement of the cells and nodes in the graph network to form an initial reservoir fluid model. Eight iterations of ES-MDA were applied with constant inflation factors of eight at each iteration. FIG. 9(a) shows the data mismatch evolution, which shows a decrease with additional iterations. The initial and updated model forecasts are shown in FIGS. 9(b) to 9(d), which show a reduction of uncertainty by the ES-MDA process. The true data (red curves) generally lie within the range of forecasts.

Figure 10:
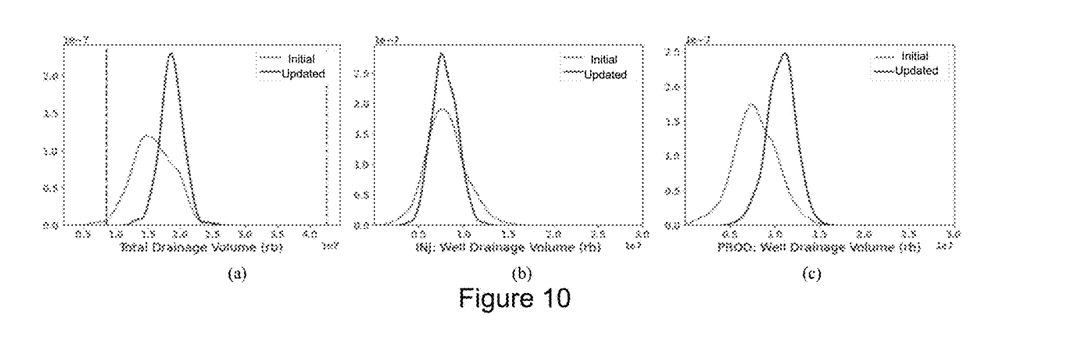

FIG. 10(a) shows the density plot of total drainage volume estimates from the initial and updated models of the present disclosure, and shows that the updated models provide a narrower range of uncertainty. The vertical black line in FIG. 10(a) is the pore volume of the channel connecting the injector-producer pair, and the vertical red line is the reservoir total pore volume. The total pore volume is outside the range of updated model forecasts, but this is expected since the total drainage volume from the injector and producer is significantly reduced due to the low-permeable mud face shown in FIG. 9(a). It is noteworthy that the updated model distribution (blue curve in 10(a)) is spanned between the total pore volume of the reservoir on the high side and the pore volume of the high permeable channel connecting the injector and the producer on the low side, as expected due to the drainage from the mud face into the high permeable channel. This indicates that the models of the present disclosure are useful in estimating the actual drainage volume. FIGS. 10(b) and 10(c) show the comparison of estimated drainage volume for the injector and producer, where uncertainty reductions are also observed.

Example 3

Figure 11:
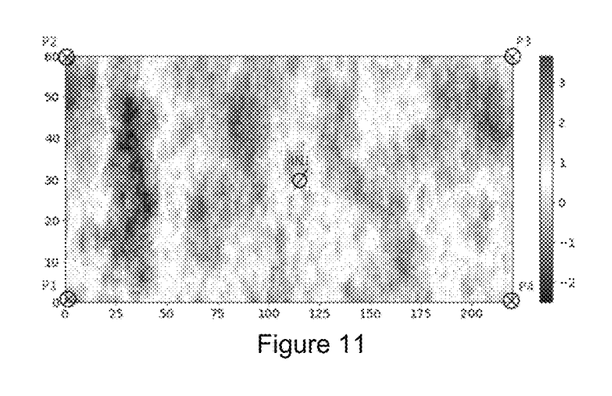
FIG. 11 is a plot of permeability distribution for a top layer of a 3D geological model having four producing wells and one injector well.

In this example, the observed data was generated by taking the top ten layers from the SPE10 benchmark model as described in Christie, M. A., & Blunt, M. J. (2001), Tenth SPE comparative solution project: A comparison of upscaling techniques. SPE Reservoir Evaluation and Engineering, 4(4), 308-316, which is incorporated herein by reference for all purposes. The log-scale permeability distribution for this highly heterogeneous system is shown in FIG. 11. The model contains 60×220×10 grid blocks, each of size 20 ft×10 ft×2 ft. A total of five wells are drilled in a five-spot pattern—one injector (INJ) in the center, and four producers around the corner (P1, P2, P3, P4). Further details on the rock and fluid properties are available in Christie & Blunt (2001) referenced above. In this study, all wells are again under BHP control of 8,000 psi and 4,000 psi for the injector and producers, respectively.

Figure 12:
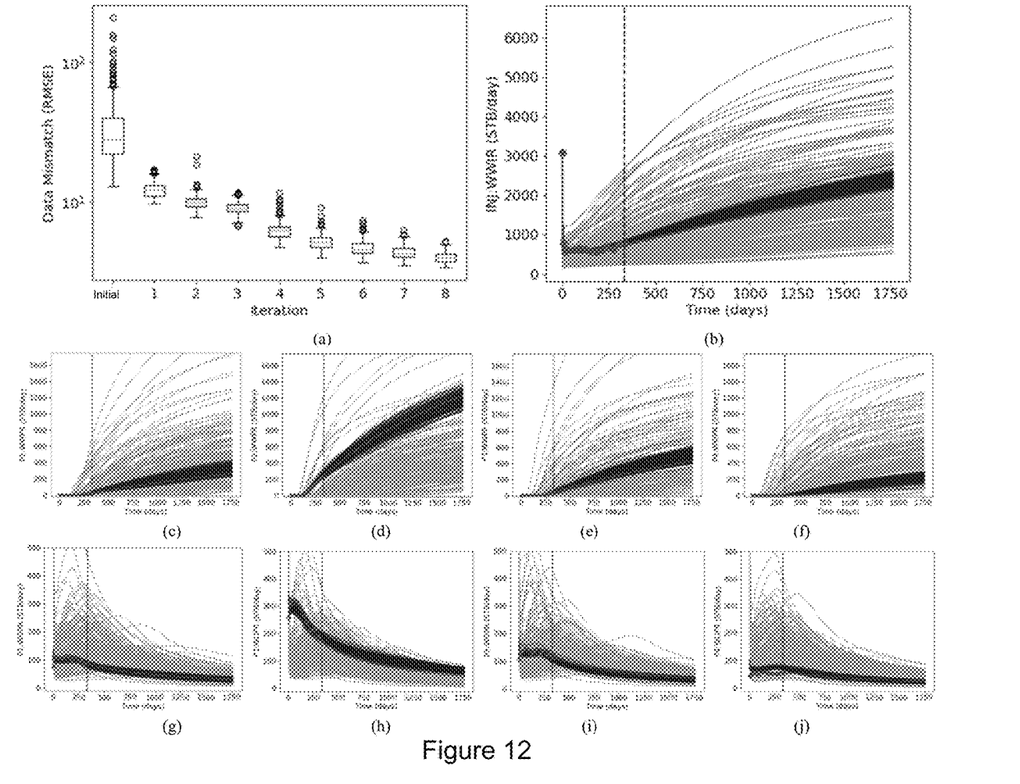

In this example, the graph network for the model of the present disclosure was constructed with four inner cells and two outer cells for each well, which leads to $n_t=85$ uncertainty parameters. The range of parameter prior distributions were determined with limited numerical experimentation to have prior predictions covering the observed data. The historical period was the first year, with monthly-observed well water injection rate (WWIR), well water production rate (WWPR), and well oil production rate (WOPR). A total of 200 graph network models were generated and simulated based on the ranges of parameters, $n_o$, $n_i$ and the arrangement of the cells and nodes in the graph network to form an initial reservoir fluid model. Eight iterations of ES-MDA were applied with constant inflation factors of eight at each iteration. FIG. 12(a) shows the data mismatch evolution and shows a decrease with additional iterations. The initial and updated model forecasts for the injector and four producers are shown in FIGS. 12(b) to 12(j), which show a reduction of uncertainty by the ES-MDA process. The true data (red curves) generally lie within the range of forecasts. The history-matching results are shown in FIG. 12.

A relatively short historical period (1 year) was used in this example in order to test the model of the present disclosure in predicting production at a well that does not have water breakthrough in history. As shown in FIG. 12(a), the ranges of prior predictions for all wells are large, resulting in a large initial data mismatch value. The ES-MDA algorithm was shown to reduce the data mismatch significantly after 8 iterations of model updating. The initial and updated model forecasts of are shown in FIGS. 12(b)-(j) for WWIR for the injector and WOPR and WWPR for the producers P1-P4, which show that the updated models by the ES-MDA process match the historical data closely and provide a tighter range that encompass the true data (red curves) in most cases.

In FIG. 12(f), the observed water rate data for producer, P4, are all zero, meaning no water breakthrough. The updated models are shown to capture this behavior and provide forecasts (blue curves) that are at the bottom of the range of prior distributions (grey curves).

The ranges of prior distributions for all four producers P1-P4, shown in FIGS. 12(c) to (f), are roughly the same. This is because the ranges of model parameters for the initial ranges for these four producers are specified to be the same. However, after data assimilation, the updated models provide different range of forecasts. For example, FIG. 12(h) shows that well P2 has the largest predicted oil rate, whereas FIG. 12(j) shows that well P4 has the smallest amount of oil production.

Figure 13:
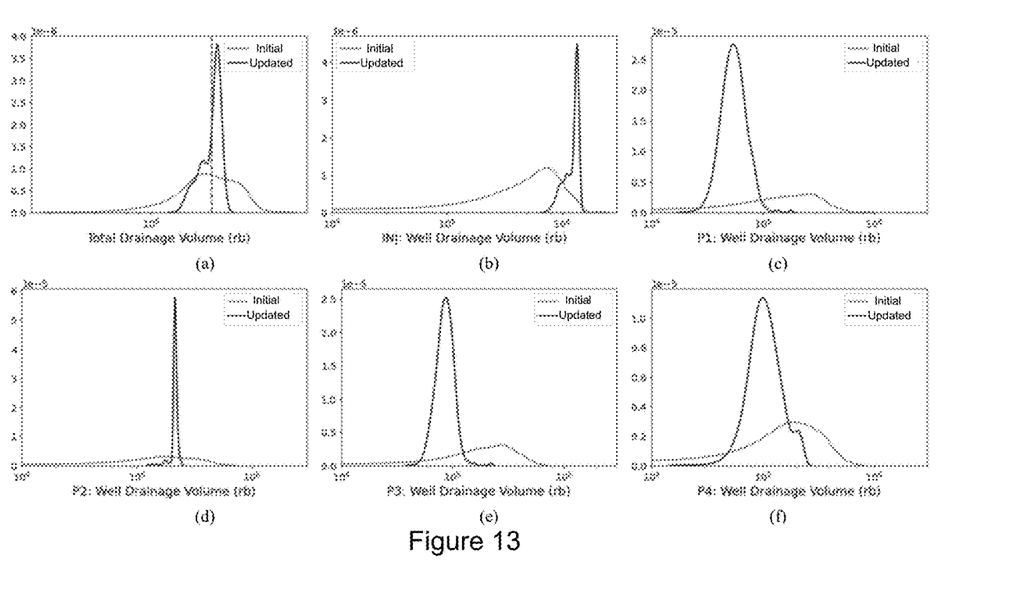

FIG. 13 displays the comparison between the drainage volume estimate for all wells, shown in FIG. 13(a), and each individual well, shown in FIGS. 13(b) to (f). In FIGS. 13(a)-(f), the x-axis for drainage volume is shown in log scale. In all cases, the updated reservoir models presented smaller ranges of uncertainty. The total reservoir pore volume (the dashed vertical red line in FIG. 13(a) is inside the predicted range. It is also clear that the estimated drainage volume for injector INJ, shown in FIG. 13(b), is larger compared with all producers, shown in FIGS. 13(c)-(f). This larger drainage volume for the injector is expected as the location of the injector is in the center of the reservoir and has access to a larger reservoir volume. The drainage volume for the updated model for P2 is narrow and is larger compared with that of other producers, which is consistent with historical production data shown in FIG. 13(d), that producer P2 has the highest water and oil rate production, indicating larger drainage volume.

This example reinforces that the modeling method of the present disclosure is very computationally efficient due to the compact model representation. The total number of graph network model grid blocks is $n_w \times (n_i + n_o)$, which is generally much smaller compared with the number of simulation grids for a full 3D model. For example, for this example, the 3D model has 132,000 grid blocks, while the graph network model only has $5 \times (4+2)=30$ grid blocks. The 3D-model simulation took about 570 seconds with 6-cores, while the model of the present disclosure only took about 0.2 seconds (on average) with a single core. In addition, due to the high simulation efficiency of the model of the present disclosure, the history matching process took only about 56 seconds, for a total number of 1,600 runs (that is, 200 model evaluations for eight iterations) when 6-cores were used for parallel computing.

Since the number of grid blocks for the model of the present disclosure increases linearly with the number of wells with a coefficient of $n_i + n_o$, the models of the present disclosure would be very efficient even for large field cases.

An embodiment of the present disclosure is a method including providing an initial fluid system model including a plurality of nodes, each node characterized by one or more node fluid system parameters; and a plurality of edges between two of the plurality of nodes, each edge characterized by one or more edge fluid system parameters; and using the initial fluid system model, determining an updated fluid system model using a history-matching process.

Another embodiment of the present disclosure is a system including modeling fluid flow in a fluid system, including one or more processors; and a memory including a plurality of non-transitory executable instructions that, when executed, case the one or more processors to provide an initial fluid system model including a plurality of nodes, each node characterized by one or more node fluid system parameters; and a plurality of edges between two of the plurality of nodes, each edge characterized by one or more edge fluid system parameters; and using the initial fluid system model, determine an updated fluid system model using a history-matching process.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method for modeling fluid flow dynamics in a fluid system, comprising:
providing an initial fluid system model comprising:
a plurality of nodes, each node characterized by one or more node fluid system parameters; and
a plurality of edges between two of the plurality of nodes, each edge characterized by one or more edge fluid system parameters; and
using the initial fluid system model, determining an updated fluid system model using a history-matching process;
wherein the fluid system comprises a subterranean fluid reservoir and one or more wells;
wherein the plurality of nodes comprise:
a plurality of well nodes, each well node corresponding to a well and characterized by a well productivity index (PI); and
a plurality of cell nodes, each cell node corresponding to a portion of the reservoir and characterized b a cell ore volume (PV);
wherein the plurality of cell nodes comprise, for each well:
one or more inner cell nodes that do not communicate with cells associated with another well; and
one or more outer cell nodes that communicate with cells associated with another well; and
wherein the fluid system is characterized by a number of inner cells and a number of outer cells.

2. The method of claim 1, wherein the history-matching process is selected from the group consisting of: an ensemble smoothing multiple data assimilation (ES-MDA) process, a gradient descent process, a stochastic optimization process, an ensemble Kalman filter, a manual search, and any combination thereof.

3. The method of claim 1, wherein the history-matching process is an ensemble smoothing multiple data assimilation (ES-MDA) process.

4. The method of claim 3, wherein the ensemble smoothing multiple data assimilation (ES-MDA) process is a history-matching process that performs parameter updating two or more times.

5. The method of claim 1, wherein:
the plurality of edges comprise:
a plurality of well-cell edges between one well node and one cell node, wherein each well-cell edge is characterized by a well-cell edge well productivity index;
a plurality of cell-cell edges between two cell nodes, wherein each cell-cell edges are characterized by one of:
a transmissibility (T), if the cell-cell edge is between cells associated with the same well; or
an interpartition transmissibility ($T_x$), if the cell-cell edge is between cells associated with two different wells; and
determining the updated fluid system model using a history-matching process includes:
determining, for one or more edges, an updated transmissibility (T) or an updated interpartition transmissibility ($T_x$);
determining, for one or more well nodes, an updated well productivity index (PI); and
determining, for one or more cell nodes, an updated cell pore volume (PV).

6. The method of claim 5, wherein, for each well, the number of inner cells is independent from the number of outer cells.

7. The method of claim 5, further comprising:
forecasting production from the subterranean fluid reservoir based, at least in part, on results of the history-matching process.

8. The method of claim 5, further comprising:
performing a well connectivity analysis, based, at least in part, on results of the history-matching process.

9. The method of claim 5, further comprising:
controlling production from the subterranean fluid reservoir, based, at least in part, on results of the history-matching process.

10. The method of claim 5, further comprising:
controlling a flooding operation of the subterranean fluid reservoir, based, at least in part, on results of the history-matching process.

11. The method of claim 5, further comprising:
designing an integrated subsurface and surface network, based, at least in part, on results of the history-matching process.

12. A system for modeling fluid flow in a fluid system, comprising:
one or more processors; and
a memory comprising a plurality of non-transitory executable instructions that, when executed, cause the one or more processors to:
provide an initial fluid system model comprising:
a plurality of nodes, each node characterized by one or more node fluid system parameters; and
a plurality of edges between two of the plurality of nodes, each edge characterized by one or more edge fluid system parameters; and
using the initial fluid system model, determine an updated fluid system model using a history-matching process;
wherein the fluid system comprises a subterranean fluid reservoir and one or more wells:
wherein the plurality of nodes comprise:
a plurality of well nodes, each well node corresponding to a well and characterized by a well productivity index (PI); and
a plurality of cell nodes, each cell node corresponding to a portion of the reservoir and characterized by a cell pore volume (PV);
wherein the plurality of cell nodes comprise, for each well:
one or more inner cell nodes that do not communicate with cells associated with another well; and
one or more outer cell nodes that communicate with cells associated with another well; and
wherein the fluid system is characterized by a number of inner cells and a number of outer cells.

13. The system of claim 12, wherein the history-matching process is an ensemble smoothing multiple data assimilation (ES-MDA) process.

14. The system of claim 13, wherein the ensemble smoothing multiple data assimilation (ES-MDA) process is a history-matching process that performs parameter updating two or more times.

15. The system of claim 12, wherein:
the plurality of edges comprise:
a plurality of well-cell edges between one well node and one cell node, wherein each well-cell edge is characterized by a well-cell edge well productivity index;
a plurality of cell-cell edges between two cell nodes, wherein each cell- cell edges are characterized by one of:
a transmissibility (T), if the cell-cell edge is between cells associated with the same well; or
an interpartition transmissibility (Tx), if the cell-cell edge is between cells associated with two different wells; and
determining the updated fluid system model using a history-matching process includes:
determining, for one or more edges, an updated transmissibility (T) or an updated interpartition transmissibility ($T_x$);
determining, for one or more well nodes, an updated well productivity index (PI); and
determining, for one or more cell nodes, an updated cell pore volume (PV).

16. The system of claim 15, wherein, for each well, the number of inner cells is independent from the number of outer cells.

* * * * *